(12) United States Patent
Winkles et al.

(10) Patent No.: US 7,519,089 B1
(45) Date of Patent: Apr. 14, 2009

(54) ARRANGEMENT IN A CHANNEL ADAPTER FOR TRANSMITTING DATA ACCORDING TO LINK WIDTHS SELECTED BASED ON RECEIVED LINK MANAGEMENT PACKETS

(75) Inventors: Joseph Winkles, Austin, TX (US); Joseph A. Bailey, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1185 days.

(21) Appl. No.: 10/083,149

(22) Filed: Feb. 27, 2002

(51) Int. Cl.
 *H04J 3/02* (2006.01)
 *H04L 12/28* (2006.01)
 *H04L 12/66* (2006.01)
 *H04Q 11/00* (2006.01)

(52) U.S. Cl. ............... 370/537; 370/419; 370/359; 370/463

(58) Field of Classification Search .......... 370/419, 370/359, 469, 236.1
See application file for complete search history.

(56) References Cited

U.S. PATENT DOCUMENTS

| | | | |
|---|---|---|---|
| 6,680,951 B1 * | 1/2004 | Aznar et al. | 370/463 |
| 6,775,719 B1 * | 8/2004 | Leitner et al. | 710/33 |
| 6,831,916 B1 * | 12/2004 | Parthasarathy et al. | 370/359 |
| 6,948,004 B2 * | 9/2005 | Gasbarro et al. | 709/250 |
| 6,961,347 B1 * | 11/2005 | Bunton et al. | 370/465 |
| 6,988,161 B2 * | 1/2006 | McConnell et al. | 710/316 |
| 7,092,629 B2 * | 8/2006 | Bunton | 398/8 |
| 7,107,359 B1 * | 9/2006 | Burton et al. | 709/250 |
| 7,149,221 B2 * | 12/2006 | Gil | 370/400 |
| 7,150,021 B1 * | 12/2006 | Vajjhala et al. | 718/104 |
| 7,209,478 B2 * | 4/2007 | Rojas et al. | 370/360 |
| 7,342,889 B2 * | 3/2008 | Harrekilde-Petersen et al. | 370/236 |
| 2002/0051445 A1 * | 5/2002 | Drottar et al. | 370/362 |
| 2004/0013088 A1 * | 1/2004 | Gregg | 370/235 |
| 2004/0210687 A1 * | 10/2004 | Mann | 710/52 |

OTHER PUBLICATIONS

Cassiday et al., "Hot Chips", *InfiniBand™ Architecture Tutorial*, Aug. 2000, pp. 1-79, InfiniBand™ Trade Association.
Hartmann, "Using The VIEO InfiniBand™ Channel Abstraction Layer (CAL)", *Channel Abstraction Layer (CAL)*, Jan. 2002, pp. 1-19, VIEO, Inc.

* cited by examiner

*Primary Examiner*—Chi H Pham
*Assistant Examiner*—Warner Wong
(74) *Attorney, Agent, or Firm*—Manelli Denison & Selter PLLC; Leon R. Turkevich

(57) ABSTRACT

A channel adapter, configured for sending frame data according to link widths selected based on management frames received from a link partner, includes a multiplexer circuit configured for selectively switching the frame data supplied according a prescribed maximum link width, to one of a plurality of available link widths for a transmit bus, and a bus controller. The bus controller is configured for controlling the multiplexer circuit to switch the frame data to one of the available link widths, including the prescribed link width, based the selected link width. Hence, a channel adapter can be configured for an optimum link width for communication with a corresponding channel adapter on a peer node.

8 Claims, 4 Drawing Sheets

ARRANGEMENT IN A CHANNEL ADAPTER FOR TRANSMITTING DATA ACCORDING TO LINK WIDTHS SELECTED BASED ON RECEIVED LINK MANAGEMENT PACKETS

BACKGROUND OF THE INVENTION

1. Field of the Invention

The present invention relates to a channel adapter configured for communication with a peer channel adapter via an InfiniBand™ link in an InfiniBand™ server system, according to a link width selected within the InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, availability, and serviceability.

In addition, processors used in servers have encountered substantial improvements, where the microprocessor speed and bandwidth have exceeded the capacity of the connected input/output (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between end nodes (e.g., central processing units, peripherals, etc.) and switches inside a server system. Hence, the term "InfiniBand™ network" refers to a private system area network (SAN) that connects end nodes and switches into a cluster within a server system, enabling the sharing of cluster resources. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading" processor code execution), hence offloading the operating system of the server system.

However, arbitrary hardware implementations may result in substantially costly or relatively inefficient hardware designs. For example, the InfiniBand™ Architecture Specification specifies a number of different link bit rates. The lowest bit rate of 2.5 gigabits per second (Gb/s) is referred to as the 1× ("times 1") link. Other link rates include 10 Gb/s (4×) and 30 Gb/s (12×). According to the InfiniBand™ Architecture Specification, during initialization of the network, link partners will determine their respective capabilities and send each other a link management packet specifying the link width to be used as the currently active link width.

However, no proposal has been made for an efficient manner for implementing a link layer module capable of efficiently supporting different link widths.

SUMMARY OF THE INVENTION

There is a need for an arrangement that enables a channel adapter to be implemented in an efficient and economical manner.

There also is a need for an arrangement that enables a channel adapter to selectively switch a data stream to a selected one of a plurality of available link widths for an output link, based on information received from link partner.

These and other needs are attained by the present invention, where a channel adapter, configured for sending frame data according to selected link widths, includes a multiplexer circuit configured for selectively switching the frame data supplied according a prescribed maximum link width, to one of a plurality of available link widths for an transmit bus, and a bus controller. The bus controller is configured for controlling the multiplexer circuit to switch the frame data to one of the available link widths, including the prescribed link width, based on a link management packet exchanged with a peer channel adapter (i.e., a link partner).

Hence, a channel adapter can be configured for an optimum link width with a link partner.

One aspect of the present invention provides a method in a channel adapter. The method includes receiving a link management packet from a link partner and in response selecting, according to InfiniBand™ protocol, a selected active link width. The method also includes setting a multiplexer circuit, configured for selectively switching frame data of a prescribed maximum link width to a selected one of a plurality of available link widths, to the selected active link width. The method also includes receiving the frame data from an output buffer according to the prescribed maximum link width, and outputting the frame data from the multiplexer circuit to a transmit bus according to the selected active link width.

Another aspect of the present invention provides a channel adapter. The channel adapter includes a memory configured for storing port configuration settings, including a selected active link width received from a link management packet according to InfiniBand™ protocol and sent by a link partner, and a link layer module. The link layer module includes a multiplexer circuit and a bus controller. The multiplexer circuit is configured for selectively switching frame data of a prescribed maximum link width to a selected one of a plurality of available link widths for transmission onto a transmit bus. The bus controller is configured for setting the multiplexer circuit to switch the frame data to the selected active link width.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
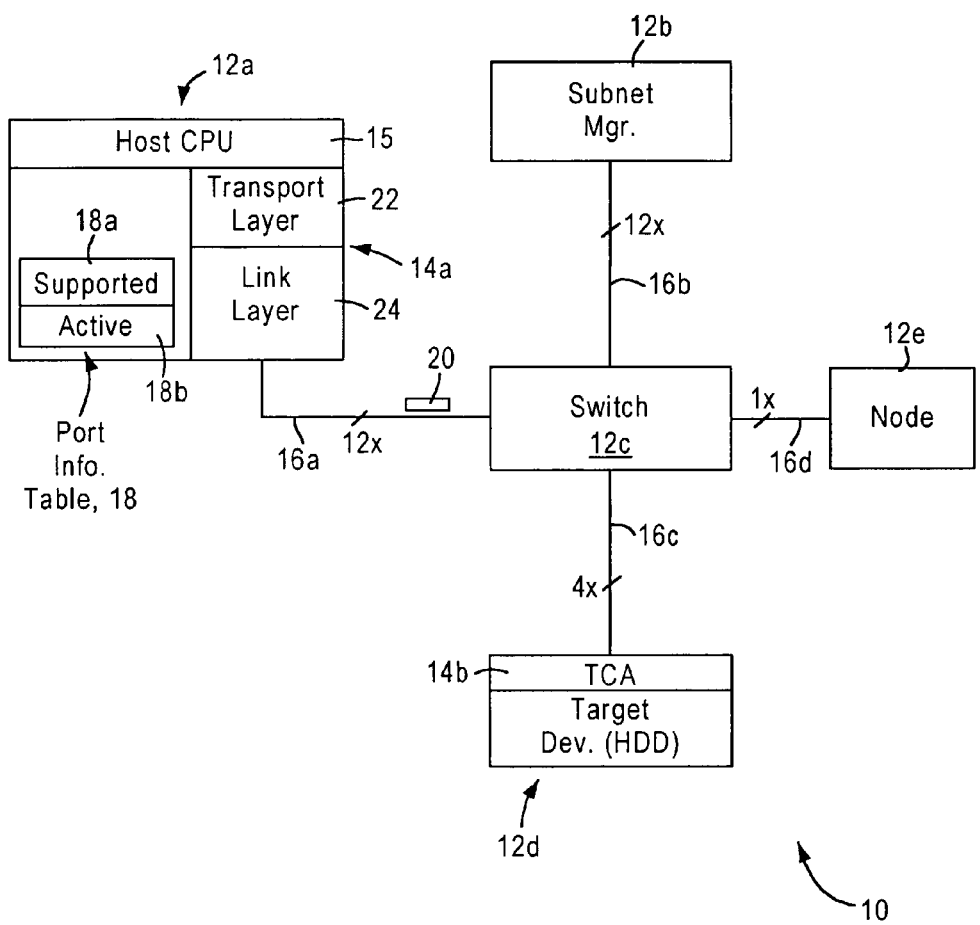
FIG. 1 is a diagram illustrating a InfiniBand™ network having channel adapters configured for setting link widths according link management packets received from link partners, according to an embodiment of the present invention.

FIG. 1 is a block diagram illustrating a system 10 having InfiniBand™ network nodes 12 with channel adapters 14 (e.g., host channel adapter (HCA) or target channel adapter (TCA)) configured for generating and transmitting packets according to an embodiment of the present invention. The channel adapters 14, compliant with the InfiniBand™ Architecture Specification, are implemented in a manner that enables each node 12 to automatically negotiate with a link partner to set the optimum link width, based on the relative link capabilities of the peer nodes. As illustrated in FIG. 1, the node 12a is implemented as a computing node that includes a host CPU 15 and a host channel adapter 14a having a transport layer 22 and a link layer 24.

Each node 12 is coupled to another node 12 by a physical link 16, also referred to as an InfiniBand™ communication channel. Each link 16 may have a different channel width, depending on the respective capabilities of the peer nodes. For example, the links 16a and 16b that couple the host computing node 12a and the subnet manager 12b to the switch 12c respectively may have a maximum channel width of 12×, based on the host computing node 12a, the subnet manager 12b, and the switch 12c each supporting (i.e., being capable of transmitting on) a 12× link width; in contrast, the links 16c and 16d may have any maximum channel width of 4× and 1×, respectively, due to the limited capabilities of the respective nodes 12d and 12e.

Hence, during initialization of the network node 12, each node includes an initialization and training module configured for performing a link initialization and training sequence to determine the capabilities of a connected peer device, also referred to as the link partner. The connected devices (e.g., devices 12a and 12c) exchange link management packets to determine the respective capabilities, and negotiate on a maximum link width for the corresponding link 16.

According to the disclosed embodiment, each channel adapter 14 includes a memory 18 configured for storing port configuration information, for example in the form of a port information table, specified in the InfiniBand™ Architecture Specification as the "PorthIfo" table. The channel adapter 14 also includes a transport layer module 22, and a link layer module 24, described below. In particular, the port information table 18 includes a link width supported field 18a that specifies the available link widths for transmission by the corresponding channel adapter 14. The port information table 18 also includes a link width active field 18b that specifies a selected active link width that is selected during initialization and training.

Hence, the initialization and training module 83 in each link partner determines the best available link width for the link 16 by sending a link management frame 20 to advertise their respective capabilities, enabling the peer channel adapters 14 to select a selected active link width to be used during transmission on the link 16. Hence, the nodes 12a and 12c would negotiate for a 12× link width for the link 16a; the nodes 12b and 12c would negotiate for a 12× link width for the link 16b; the nodes 12c and 12d would negotiate for a 4× link width for the link 16c based on to the limitations of the node 12d, and the nodes 12c and 12e would negotiate for a 1× link for the link 16d based on the limitations of the node 12e.

Figure 2:
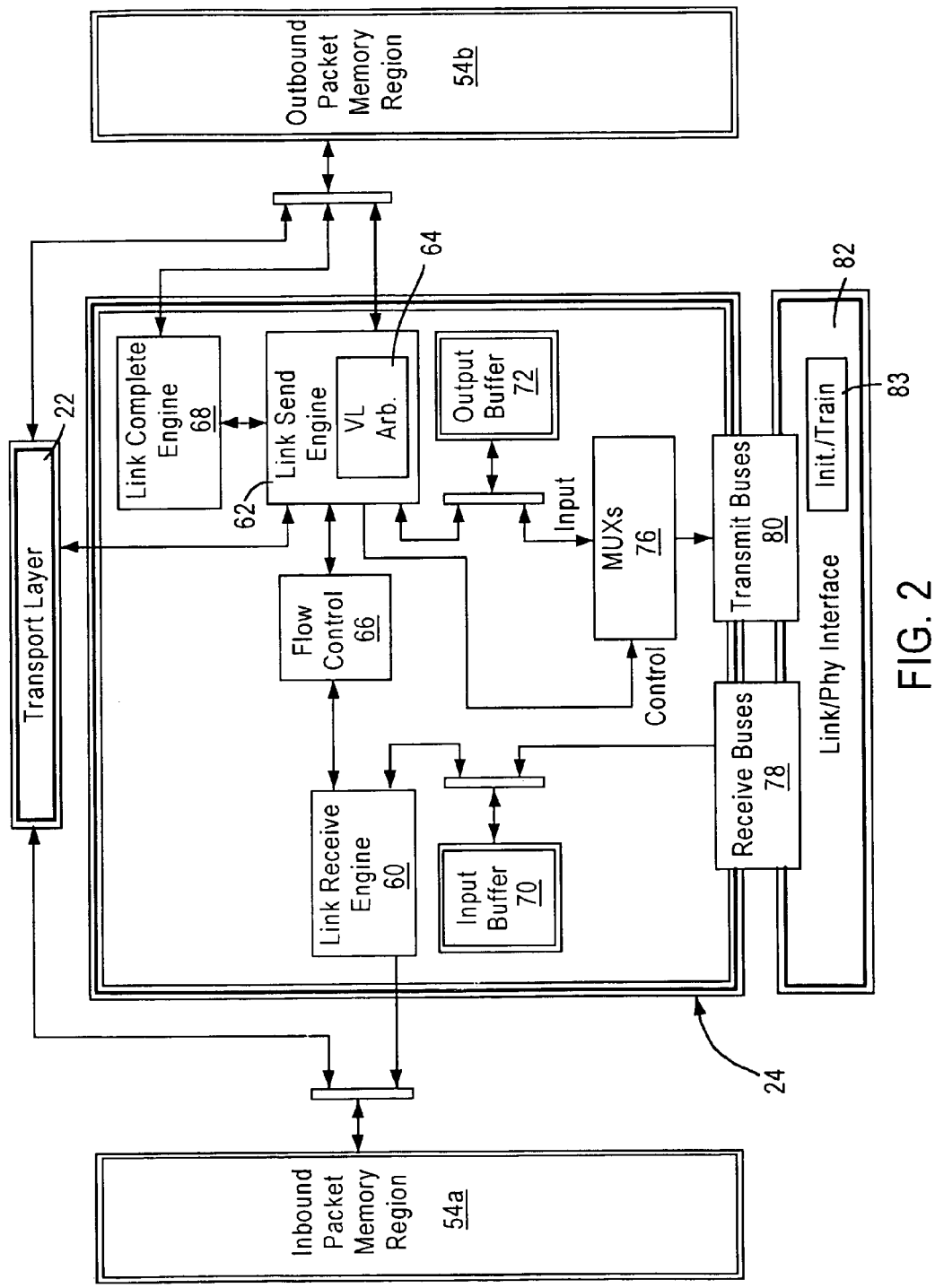
FIG. 2 is a diagram illustrating in detail the link layer of FIG. 1.

FIG. 2 is a diagram illustrating in further detail the link layer module 24 according to an embodiment of the present invention. The link layer module 24 includes a link receive engine 60, a link send engine 62, a flow control engine 66, and a link complete engine 68. The link layer module 24 also includes an input buffer 70, an output buffer 72, a multiplexer circuit 76, a receive bus 78, a transmit bus 80, and a link/PHY interface 82.

The link/PHY interface 82 includes an initialization and training module 83 configured for sending management frames 20 that include the supported link information as specified by the register 18a, and selecting the active link width based on the management frame 20 received from the link partner. The initialization and training module 83 completes initialization and training with the link partner by confirming the selected active link width, and stores the active link width in the active link width register 18b.

The link receive engine 60 is configured for managing link layer operations associated with receiving data packets, and the link send engine 62 is configured for managing link layer operations associated with transmitting data packets, according to the InfiniBand™ specification. The link send engine 62 also includes a virtual lane arbitration module 64 configured for performing virtual lane arbitration, for example weighted round robin arbitration. In particular, virtual lanes, defined in the InfiniBand™ Architecture Specification, enable multiple logical flows to be implemented over a single physical link, where link level flow control can be applied to one virtual lane without affecting other virtual lanes.

The link complete engine 68 is configured for preparing packets for transmission, for example by constructing a local routing header (LRH), calculating a cyclic redundancy check (CRC) value for the packet, and appending the LRH and CRC fields to the packets.

The VL arbitration module 64 is implemented as a state machine with registers, and is configured for managing the VL arbitration table (not shown) supplied by the host process 15, for servicing of the virtual lanes. The VL arbitration module 64 also determines which virtual lane to service, in what order, and for what duration (e.g., based on bandwidth considerations, internal buffer capacity, flow control credits or combination thereof). The establishment and tear down of virtual lanes is managed by the link complete engine 68.

The link layer module 24 outputs the transmit packets according to a credit-based flow control managed by the flow control module 66. In particular, the flow control module 66 monitors the available credits for transmission of a transmit packet on the assigned virtual lane. In particular, credits are sent on a per virtual lane basis, where a receiver issues a credit based on packets taken from an incoming virtual lane buffer; the credits are sent to the sender, enabling the sender to manage flow control. Hence, if the flow control module 66 determines that an identified virtual lane has an insufficient number of credits, the flow control module 66 sends an instruction to the link send engine 62 to defer transmission on the corresponding virtual lane until a sufficient number of credits have been received.

The output buffer 72 and the input buffer 70 each are implemented, for example, as first in first out (FIFO) buffers. The output buffer 72 is configured for buffering transmit data, including payload data retrieved from the outbound memory buffer 54b, following link layer processing by the link send engine 62. The outbound memory buffer 54b includes multiple internal buffers assigned to the respective virtual lanes.

The multiplexer 76, controlled by the link send engine 62, is used to select a link width of the port. In particular, the multiplexer 76 is used to enable selection of 1×, 4×, and 12× link widths according to the InfiniBand™ Specification. The link send engine 62, also referred to as a bus controller, determines the selected active link width based on reading the link width active field 18b in the port info table 18 during initialization. The bus controller 62 sets the multiplexer circuit 76 to switch the frame data according to the selected active link width. The bus controller 62 also is configured for outputting sequencing signals for controlling the sequence of outputting frame data units onto the link 16 when the link 16 is less than the prescribed maximum link width (e.g., 16×).

Figure 3:
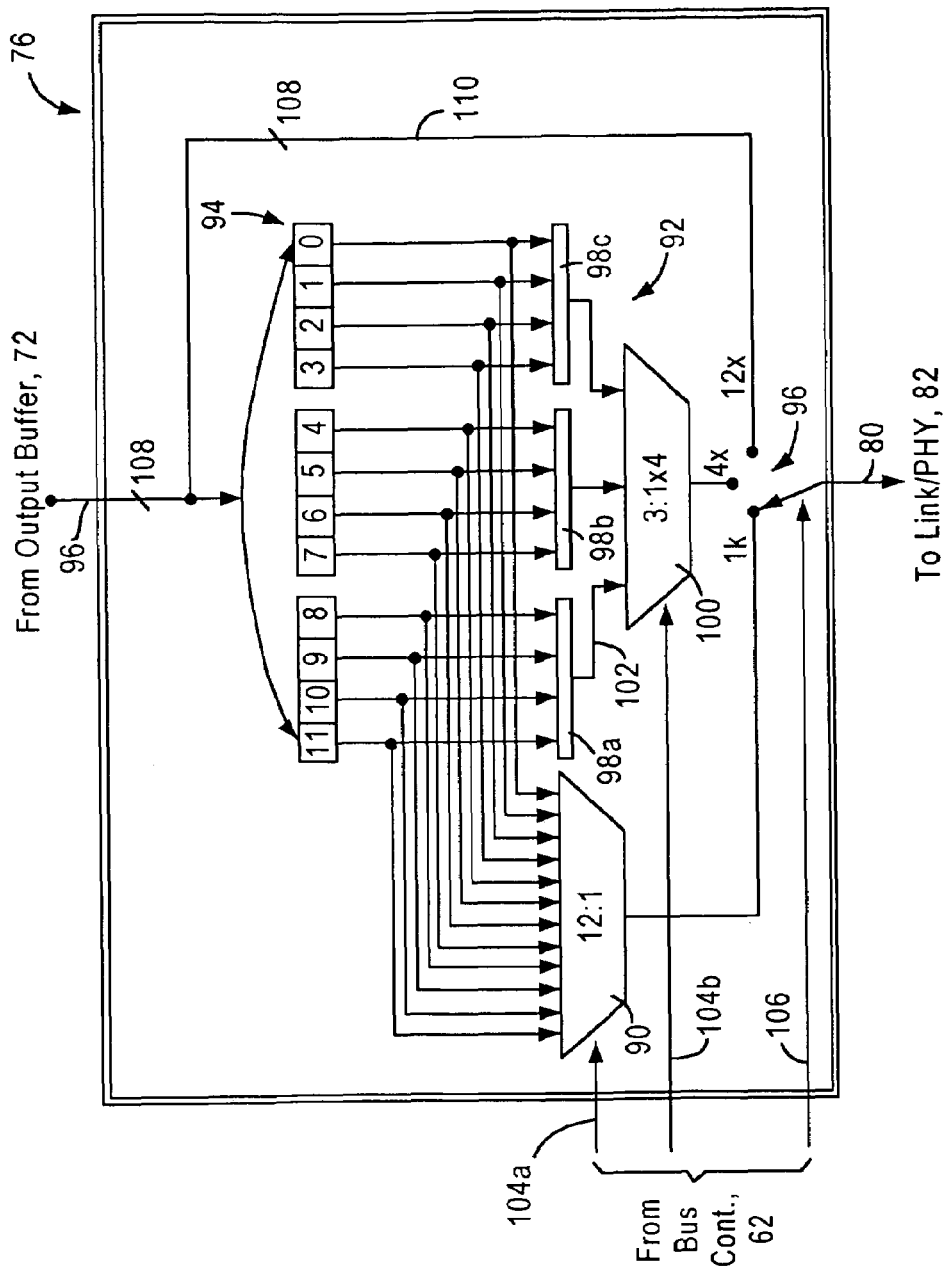
FIG. 3 is a diagram illustrating in detail the multiplexer circuit of FIG. 2.

FIG. 3 is a diagram illustrating in detail the multiplexer circuit 76 according to an embodiment of the present invention. The multiplexer circuit 76 includes a first 12:1 multiplexer 90, a second 3:1×4 multiplexer circuit 92, a plurality of registers 94, and a switch 96. Each register 94 is configured for storing a corresponding unit of flame data, for example a 9-bit hyperbyte received from the output buffer 72: a "hyperbyte" is a nine-bit value having a single control bit that specifies whether the following byte is data or a control symbol (e.g., a start packet delimiter, an end packet delimiter, a pad byte, etc.).

Hence, each memory read from the output buffer 72 results in the simultaneous transfer of 12 hyperbytes on a 108-bit input bus 96, enabling the buffering of the hyperbytes during sequential outputting onto either a 1× link or a 4× link by the 12:1 multiplexer 90 or the multiplexer circuit 92. In particular, outputting of the hyperbytes for a link 16 having a 1× link width causes the bus controller 62 to control the 12:1 multiplexer 90 to output each of the hyperbytes in sequence based on a sequencing signal 104a supplied by the bus controller 62.

Outputting of the hyperbytes for a link 16 having a 4× link width causes the bus controller 62 to control the 3:1×4 multiplexer circuit 92 to output the hyperbytes in a sequence of hyperbyte groups. In particular, the multiplexer circuit 92 includes bus circuits 98a, 98b, and 98c, and a multiplexer 100. Each bus circuit 98 groups selected frame data units (e.g., hyperbytes) into a corresponding unit group 102 composed of four hyperbytes. Hence, the bus controller 62 controls the multiplexer 100 to output a selected hyperbyte group 102 during each transmission cycle, causing the hyperbyte groups output by the bus circuits 98a, 98b, and 98c to be output in sequence by the multiplexer 100 based on the sequencing signal 104b.

The switch 96 is configured for switching the frame data according to the selected active link width specified in the link width active register 18b based on the switching control signal 106 from the bus controller 62. Hence, the multiplexer circuit 76 may output twelve (12) hyperbytes in sequence for a 1× link, or three (3) 4-hyperbyte groups in sequence for a 4× link. In the case of a 12× link that corresponds to the prescribed maximum link width, the switch 96 selects a 108-bit bypass bus 110 that bypasses the multiplexer circuitry.

Figure 4:
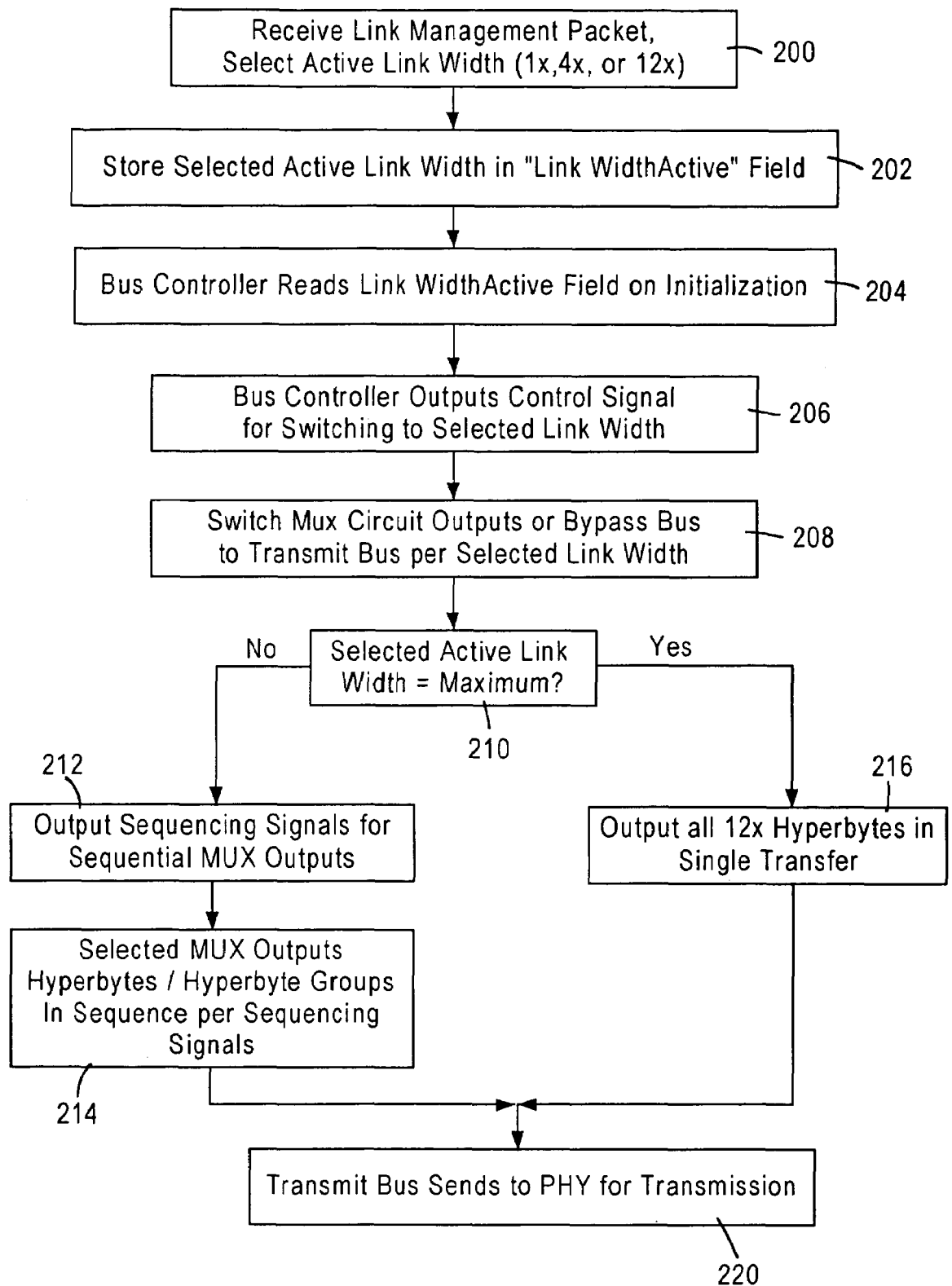
FIG. 4 is a diagram illustrating the method of setting link widths, according to an embodiment of the present invention.

FIG. 4 is a flow diagram illustrating the method of setting a channel adapter to transmit data according to a selected link width, according to an embodiment of the present invention. The method begins in step 200, where the initialization and training module 83 receives a link management packet from the link partner, and selects an active link width to be used by the channel adapter. The initialization and training module 83 stores in step 202 the selected active link width in the link width active field 18b of the nonvolatile configuration memory 18.

The bus controller 62 during initialization reads the link width active field 18b in step 204, and implements the selected active link width by outputting the control signal 106 in step 206, causing the switch 96 of the multiplexer circuit 76 to connect in step 208 the transmit bus 80 to the appropriate circuit. For example, the bus controller 62 sets the control signal 106 to connect the transmit bus 80 to the multiplexer 90, the multiplexer 100, and the bypass bus 110 based on the selected link width specifying a 1×, 4×, and 12× width, respectively.

If in step 210 the selected link width is less than the maximum prescribed link width of 12×, the bus controller 62 outputs in step 212 the appropriate sequencing signal 104a or 104b, enabling the multiplexer 90 or the multiplexer 100 to output in step 214 the hyperbyte data according to the appropriate sequence, respectively. If in step 210 the selected link width corresponds to the maximum prescribed link width of 12×, the multiplexer 76 outputs the data as a single 12× link transfer from the output buffer 72 to the transmit bus 80 in step 216, enabling the link/PHY interface 82 to complete PHY layer operations in step 220, including 8B/10B encoding, serializing, etc.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a channel adapter, the method comprising:
receiving a link management packet from a link partner and in response selecting, according to Infiniband™ protocol, a selected active link width of a physical link;
setting a multiplexer circuit, configured for selectively switching frame data of a prescribed maximum link width to a selected one of a plurality of available link widths, to the selected active link width;
receiving the frame data from an output buffer according to the prescribed maximum link width; and
outputting the frame data from the multiplexer circuit to a transmit bus according to the selected active link width;
wherein the multiplexer circuit includes a first multiplexer for outputting the frame data onto a first output according to a first of the available link widths, and a second multiplexer circuit, distinct from the first multiplexer, configured for switching the frame data onto a second output according to a second of the available link widths, the setting step including selecting one of the output buffer, the first output, and or the second output for transfer of the frame data according to the selected active link width.

2. The method of claim 1, wherein the multiplexer circuit further includes a prescribed number of registers, corresponding to the prescribed maximum link width, for storing respective units of the frame data, the outputting step including outputting the frame data units in a sequence relative to the selected active link width.

3. The method of claim 2, wherein the second multiplexer circuit outputting step including causing the second multiplexer circuit to output each of the unit groups in sequence based on the sequencing signals.

4. The method of claim 2, wherein the outputting step includes outputting from the first multiplexer a corresponding one of the frame data units in sequence.

5. A channel adapter comprising:
a memory configured for storing port configuration settings, including a selected active link width of a physical link based on a received link management packet according to Infiniband™ protocol and sent by a link partner; and a link layer module including:

(1) a multiplexer circuit configured for selectively switching frame data of a prescribed maximum link width to a selected one of a plurality of available link widths for transmission onto a transmit bus, and (2) a bus controller configured for setting the multiplexer circuit to switch the frame data to the selected active link width;

wherein the multiplexer circuit includes a first multiplexer for outputting the frame data onto a first output according to a first of the available link widths, and a second multiplexer circuit, distinct from the first multiplexer, configured for switching the frame data onto a second output according to a second of the available link widths, the bus controller configured for selecting one of the prescribed maximum link width, the first output, and or the second output for transfer of the frame data according to the selected active link width.

6. The channel adapter of claim 5, wherein the multiplexer circuit further includes a prescribed number of registers, corresponding to the prescribed maximum link width, for storing respective units of the frame data, the multiplexer circuit configured for outputting the frame data units in a sequence relative to the selected active link width based on sequencing signals output by the bus controller.

7. The channel adapter of claim 5, wherein the second multiplexer circuit is configured for grouping the frame data units into a plurality of unit groups, the second multiplexer circuit configured for outputting a selected one of the unit groups based on the sequencing signals.

8. The channel adapter of claim 6, wherein the first multiplexer is configured for outputting a corresponding one of the frame data units in sequence based on the sequencing signals.

* * * * *